US010909621B2

(12) United States Patent
Melton (10) Patent No.: US 10,909,621 B2
(45) Date of Patent: *Feb. 2, 2021

(54) SYSTEMS AND METHODS FOR QUANTIFYING TEMPORAL FAIRNESS ON ELECTRONIC TRADING VENUES

(71) Applicant: THOMSON REUTERS GLOBAL RESOURCES, Baar (CH)

(72) Inventor: Hayden Paul Melton, Philadelphia, PA (US)

(73) Assignee: Refinitiv US Organization LLC, New York, NY (US)

( * ) Notice: Subject to any disclaimer, the term of this patent is extended or adjusted under 35 U.S.C. 154(b) by 903 days.

This patent is subject to a terminal disclaimer.

(21) Appl. No.: 14/930,499

(22) Filed: Nov. 2, 2015

(65) Prior Publication Data
US 2016/0104242 A1 Apr. 14, 2016

Related U.S. Application Data

(63) Continuation of application No. 14/533,543, filed on Nov. 5, 2014.
(Continued)

(51) Int. Cl.
*G06Q 40/00* (2012.01)
*G06Q 40/04* (2012.01)
*G06Q 10/06* (2012.01)

(52) U.S. Cl.
CPC ......... *G06Q 40/04* (2013.01); *G06Q 10/0639* (2013.01)

(58) Field of Classification Search
CPC ......... G06Q 40/00; G06Q 40/04; G06Q 40/06
See application file for complete search history.

(56) References Cited

U.S. PATENT DOCUMENTS 7,469,324 B2 12/2008 Tene et al. ............ 711/159
8,533,100 B2 9/2013 Cushing ............... 705/37
(Continued)

FOREIGN PATENT DOCUMENTS

CA 2956079 2/2016
CA 2944925 A1 4/2016
(Continued)

OTHER PUBLICATIONS

D: Real-time aggregated datafeeds Anonymous. Inside Market Data Reference : IMD Reference; London, (2009). (Year: 2009).*
(Continued)

*Primary Examiner* — Lalita M Hamilton
(74) *Attorney, Agent, or Firm* — Sheppard Mullin Richter & Hampton LLP (57) ABSTRACT

A system and method is disclosed for quantifying temporal fairness on an electronic trading venue as a scalar value with unit time. The system may, for an instrument traded on the venue, construct some pluralities of time deltas associated with each pair of market participants in a plurality of such that are active on the instrument. The system may populate these pluralities of time deltas by determining the amount of time that elapses between when the first and second participant in a pair each send (or are sent) a similar message to (or from) the venue. Through analysis of these pluralities of time deltas the system may find two minimum values, $f_{ords}$ and $f_{mktdata}$, the sum of which may quantify temporal fairness for the instrument on the venue. The resultant sum may inform the value of a latency floor deployed for the instrument on the venue.

22 Claims, 4 Drawing Sheets

Related U.S. Application Data (60) Provisional application No. 62/090,568, filed on Dec. 11, 2014, provisional application No. 62/029,042, filed on Jul. 25, 2014, provisional application No. 61/900,087, filed on Nov. 5, 2013.

(56) References Cited

U.S. PATENT DOCUMENTS

| | | | |
|---|---|---|---|
| 8,719,146 | B2 | 5/2014 | Sellberg |
| 9,667,751 | B2* | 5/2017 | Fallon ................. H04L 12/1895 |
| 9,672,565 | B2* | 6/2017 | Parsons .................. G06Q 40/00 |
| 2002/0023048 | A1* | 2/2002 | Buhannic ............... G06Q 10/10 705/37 |
| 2002/0057717 | A1 | 5/2002 | Mallory |
| 2002/0178108 | A1 | 11/2002 | Tresser |
| 2004/0042506 | A1* | 3/2004 | Fallon .................... G06Q 40/04 370/521 |
| 2008/0228622 | A1 | 9/2008 | Adcock |
| 2008/0243675 | A1* | 10/2008 | Parsons .................. G06Q 40/00 705/37 |
| 2008/0275806 | A1 | 11/2008 | Raitsev |
| 2008/0301061 | A1* | 12/2008 | Kittelsen ............... G06Q 40/04 705/36 R |
| 2009/0181777 | A1 | 7/2009 | Christiani |
| 2009/0210337 | A1* | 8/2009 | Mahoney ............... G06Q 40/04 705/37 |
| 2010/0036763 | A1 | 2/2010 | Driscoll .......................... 705/37 |
| 2011/0040669 | A1 | 2/2011 | Lee et al. ........................ 705/37 |
| 2011/0047104 | A1 | 2/2011 | Czupek et al. ............... 705/500 |
| 2012/0054084 | A1 | 3/2012 | Wolf et al. ...................... 705/37 |
| 2012/0089496 | A1* | 4/2012 | Taylor .................... G06Q 40/04 705/35 |
| 2013/0275284 | A1 | 10/2013 | Messina |
| 2013/0297478 | A1 | 11/2013 | Mannix .......................... 705/37 |
| 2014/0180904 | A1* | 6/2014 | Parsons .................. G06Q 40/04 705/37 |
| 2015/0006349 | A1 | 1/2015 | Eddy et al. ..................... 705/37 |
| 2015/0006350 | A1 | 1/2015 | Prasad et al. ................... 705/37 |
| 2015/0066727 | A1 | 3/2015 | Wepsic et al. .................. 705/37 |
| 2015/0073963 | A1 | 3/2015 | Kane |
| 2015/0073967 | A1* | 3/2015 | Katsuyama ............ G06Q 40/04 705/37 |
| 2015/0073970 | A1* | 3/2015 | Merold .................. G06Q 40/04 705/37 |
| 2015/0127519 | A1 | 5/2015 | Melton |
| 2015/0262297 | A1 | 9/2015 | Callaway et al. |
| 2015/0356679 | A1* | 12/2015 | Schmitt .................. G06Q 40/06 705/37 |
| 2016/0364437 | A1 | 12/2016 | Djurdjevic |

FOREIGN PATENT DOCUMENTS

| | | |
|---|---|---|
| EP | 1605384 | 12/2005 |
| EP | 3223226 A1 | 9/2017 |
| JP | 2012515991 | 7/2012 |
| WO | 2001098961 A2 | 12/2001 |
| WO | 2014055130 A1 | 4/2014 |

OTHER PUBLICATIONS

Mannix, Brian F., "Regulatory Studies Center: Public Interest Comment on The Security and Exchange Commission's Market Technology Roundtable", The George Washington University, SEC Release No. 34-67802, SEC File No. 4-652, Oct. 23, 2012, 20 pages.

"Not All Speed Bump Markets are Created Equal: Unintended Consequences, Conflicts of Interest and the Chaos that will Stem from a Partial Order Protection Rule", An Aequitas Neo Exchange Position Paper, Jul. 2015, 6 pages.

Aldrick, Philip, "The Brit Beating the Forex Flash Boys in Less Time than the Blink of an Eye: High-Frequency Trading is Timed in Milliseconds, But It Has Taken Several Years to Challenge It", The Times, Nov. 21, 2015, 6 pages.

Alpha Exchange Inc., Notice of Proposed Rule Amendments and Request for Comments on the Trading Policy Manual, URL: <http://www.osc.gov.on.ca/documents/en/Marketplaces/alpha-exchange_20141106_amd-request-for-comments.pdf>, 59 pages.

Curex FX ECN Index Liquidity Pool Rules, Version 3, Dec. 19, 2014, Curex Innovations LLC, 9 pages.

Osipovich, Alexander, "New York Stock Exchange Adopts 'Speed Bump' for One of Its Markets", The Wall Street Journal, Jan. 25, 2017, 2 pages.

Securities and Exchange Commission, Filing by Chicago Stock Exchange, "Proposed Rule Change to Adopt the CHX Liquidity Taking Access Delay", File No. SR-2016-16, <URL: http://www.chx.com/_posts/rule-filings/ProposedFilings/CHX-2016-16.pdf>, Sep. 6, 2016, 123 pages.

Whitt, Ward, "The Amount of Overtaking in a Network of Queues", Networks, vol. 14, Issue 3, Fall 1984, Wiley Online Library, pp. 411-426.

Gode, Dhananjay K., et al., "Designing Electronic Markets: On the Impossibility of Equitable Continuously-Clearing Mechanisms with Geographically Distributed Agents", <URL: https://www.frbatlanta.org/-/media/documents/filelegacydocs/ACF35B.pdf>, Feb. 2000, 12 pages.

Gode, Dhananjay K., et al., "On the Impossibility of Equitable Continously-Clearing Markets with Geographically Distributed Traders", <URL: http://faculty.som.yale.edu/shyamsunder/Research/Experimental%20Economics%20and %20Finance/Presentations%20and%20Working%20Papers/Network/Design13march2000.pdf>, Feb. 2000, 15 pages.

Gordon, Ethel Sherry, "New Problems in Queues: Social Injustice and Server Production Management", Ph.D. Thesis, Massachusetts Institute of Technology, Department of Nuclear Engineering, copyright 1987, 436 pages.

Sellberg, Lars-Ivar, "Using Adaptive Micro Auctions to Provide Efficient Price Discovery When Access in Terms of Latency is Differentiated Among Market Participants", White Paper, Cinnober Financial Technology AB, Oct. 20, 2010, 8 pages.

Budish, Eric et al., "The High-Frequency Trading Arms Race: Frequent Batch Auctions as a Market Design Response", Dec. 23, 2013, 70 pages.

Farmer, J.Doyne, "Review of the Benefits of a Continuous Market Vs. Randomised Stop Auctions and of Alternative Priority Rules (policy options 7 and 12)", European Commission Public Consultation; Review of the Markets in Financial Instruments Directive , Mar. 28, 2012, 25 pages.

Harris, Larry, "What to Do About High-Frequency Trading", *Financial Analysts Journal*, CFA Institue, Mar./Apr. 2013, 4 pages.

Jones, Charles M. "What Do We Know About High-Frequency Trading?", Columbia Business School, Version 3.4, Mar. 20, 2013, 56 pages.

Budish, Eric et al, "Implementation Details for Frequent Batch Auctions: Slowing Down Markets to the Blink of an Eye", *American Economic Review*, vol. 104, No. 5, May 2014, 7 pages.

Szalay, Eva, "Life in the Slow Lane", printed from , *Automated Trader Magazine*, Issue 30, Q3 2013, 2 pages.

Onstad, Eric et al., "Analysis: 'Slow Frequency' Technology Faces Tough Shift from FX to Stock Markets", printed from , Oct. 2, 2013, 4 pages.

Brown, Alasdair, et al., "Slowing Down Fast Traders: Evidence from the Betfair Speed Bump", School of Economics, University of East Anglia, Norwich, U.K., Jun. 21, 2016, 51 pages.

Eholzer, W., "Some Insights Into the Details that Matter for High-Frequency Trading!", Eurez Exchange's T7, www.eurexchange.com, Nov. 2013, 40 pages.

"Turquoise Uncross" Factsheet, London Stock Exchange Group, <URL: http://www.lseg.com/sites/default/files/content/documents/Turquoise%20Uncross%20Factsheet.pdf>, 2016, 1 page.

Aquilina, Matteo, et al., "Dark Pool Reference Price Latency Arbitrage", <URL: http:ifrogs.org/PDF/CONF_2017/Aquilina_Foley_Oneill_Ruf_2017.pdf>, May 10, 2017, 55 pages.

"Neovest Selects SunGard for Co-location and Direct Market Data Connectivity", Business Wire, Jun. 9, 2003, printed from <URL:

(56) References Cited

OTHER PUBLICATIONS https://dialog.proquest.com/professional/docview/ 666838717/ 168435B5A75497688D3/22? accountid=142257>, 5792, 4 pages.

* cited by examiner

SYSTEMS AND METHODS FOR QUANTIFYING TEMPORAL FAIRNESS ON ELECTRONIC TRADING VENUES

CROSS-REFERENCE TO RELATED APPLICATIONS

This application claims priority to U.S. Provisional Patent Application No. 62/090,568, filed Dec. 11, 2014, entitled "Method for Quantifying Temporal Fairness on Electronic Trading Venues," and is a continuation-in-part application of U.S. patent application Ser. No. 14/533,543, filed Nov. 5, 2014, entitled, "Ideal Latency Floor," both of which are incorporated by reference in their entireties herein.

FIELD OF THE INVENTION

The invention specifies systems and methods for quantifying temporal fairness on an electronic trading venue by analyzing a population of time deltas that indicate whether, and/or by how much time, a given market participant has beaten at least one other market participant in sending (or being sent) similar messages to (or from) the venue.

BACKGROUND OF THE INVENTION

Operators of electronic trading venues have obligations to ensure the markets they operate are fair. While fairness in the context of financial markets is a broad and multifaceted concept, on an electronic trading venue implementing time-priority based rules for processing orders (or more generally messages), one important form of fairness that manifests in the relative times at which participants are sent (or themselves send) similar data to and from the venue is temporal fairness.

In general, a financial market may be considered (or defined) to be temporally fair if all participants in that market have the opportunity to both receive and act upon information material to it at substantially the same time. Roughly speaking, and relating to the "receiving" part of this general definition, an electronic trading venue may be considered temporally fair if no market participant is habitually being sent market data updates before any other participant. Also roughly speaking, and relating to the "acting upon" part of this general definition, an electronic trading venue may be considered to be temporally fair if delays associated with the venue's processing of each message it receives do not cause one participant's orders to habitually "overtake" another's. In this context an order is said to "overtake" another if the former was received by the venue earlier than the latter, but the latter was ultimately processed by the venue (e.g., against the instrument's limit order book or other similar structure) before the former. Temporal fairness oftentimes is elusive due to the nature of communication networks, such as various network latencies or other network performance issues that result from modern communication networks.

Ensuring electronic trading venues achieve temporal fairness as it is defined above requires careful design and implementation of the software and hardware components comprising the venue. However, careful design and implementation alone are not enough to prove the venue is actually achieving temporal fairness. Rather, proving the venue is temporally fair requires taking appropriate measurements of actual data flowing in and out of it (usually at the network-level), and employing an appropriate methodology to analyze that data. Further, this measurement and analysis process should be performed repeatedly and preferably regularly, over time, to ensure that changes to the venue's software and hardware components (such as upgrades, addition or removal of participants/instruments, reconfigurations and so on) do not degrade the venue's temporal fairness.

Conventional approaches to measuring temporal fairness suffer a number of drawbacks. Some such approaches use techniques and measurements that are thought—though perhaps not theoretically or empirically proven—to be correlated with actual temporal fairness. One such approach may involve identifying a group of participants all of whom have similar response times, and comparing their individual successes in winning "races" to take (or aggress) prices when those participants compete with one another on the venue. Another such approach may similarly involve identifying a group of participants, and then attempting to ascertain which are advantaged over others by counting the number of times each receives price updates before the others. These conventional approaches seem to quantify temporal fairness in terms of participants, by identifying which such participants are in some way(s) temporally advantaged over others. They do not however seem to quantify temporal fairness as a scalar measurement with unit time.

For many reasons it is desirable to be able to quantify temporal fairness as a scalar measurement, having unit time. By having such a measurement (with unit time), a precise delay period for a mechanism such as a latency floor that "batches up" and (effectively) reorders messages flowing into and out of the venue may be inferred. Such a mechanism, its delay period being informed by the value of that measurement, may provide temporal fairness on a venue that would otherwise be considered temporally unfair. Further, such a scalar value may unambiguously be used to determine if temporal fairness has improved, worsened or remained steady, e.g., by comparing the relative magnitudes of two such measurements.

These and other drawbacks exist with conventional systems for quantifiably measuring fairness in electronic trading venues, thereby motivating the invention described herein.

SUMMARY OF THE INVENTION

The invention addressing these and other drawbacks relates to systems and methods for quantifying temporal fairness on an electronic trading venue by analyzing a population of time deltas that indicate whether, and/or by how much time, a given market participant has "beaten" at least one other market participant when those participants send (or are sent) similar messages to (or from) on the venue.

For instance, the system may obtain market activity information associated with a first market participant and a second market participant. One such form of market activity information may indicate messages received by the venue from market participants relating to an instrument traded on the electronic trading venue. Such messages may relate to, without limitation, orders (e.g., new order requests, cancel requests, replace requests, etc.). Another such form of market activity may indicate messages sent by the venue to the participants relating to an instrument traded on the electronic trading venue. Such messages may relate to, without limitation, market data updates (e.g., credit screened snapshots of the instrument's limit order book, unscreened snapshots of it, etc.).

The system may further determine, based on the market activity information, a first plurality of time deltas that each indicate an amount of time in which the first market participant has temporally beaten the second market participant with respect to a form of market activity related to an instrument traded on the electronic trading venue.

The system may, based on the market activity information, a second plurality of time deltas that each indicate an amount of time in which the second market participant has temporally beaten the first market participant with respect to that same form of market activity related to the instrument traded on the electronic trading venue.

The system may determine a quantified level of temporal fairness as a scalar value having unit time with respect to the first market participant and the second market participant on the electronic trading venue based on the first plurality of time deltas and the second plurality of time deltas. This scalar value with unit time determined by the system may be such that the magnitude of the value indicates the degree of temporal unfairness, with larger values indicating a higher degree of temporal unfairness and smaller values indicating a lower degree of temporal unfairness. A scalar value of zero may indicate temporal unfairness has been eliminated and thus temporal fairness has been achieved.

The system may, in analyzing a first and second plurality of time deltas for a pair of participant's market activity on an instrument relating to market data update messages, determine a minimum value for "$f_{mktdata}$", given $f_{mktdata} \geq 0$, such that the number of values strictly greater than $f_{mktdata}$ in the first plurality of time deltas plus "X" is approximately equal to the number of values strictly greater than $f_{mktdata}$ in the second plurality of time deltas plus "X". Typically, the value of "X" will be determined by counting the number of values across the both pluralities of time deltas that are less than or equal to $f_{mktdata}$, and halving that count.

The system may, in analyzing a first and second plurality of time deltas for a pair of participant's market activity on an instrument relating to order messages, determine a minimum value for "$f_{ords}$", given $f_{ords} \geq 0$, such that the number of values strictly greater than $f_{ords}$ in the first plurality of time deltas plus "Y" is approximately equal to the number of values strictly greater than $f_{ords}$ in the second plurality of time deltas plus "Y". Typically, the value of "Y" will be determined by counting the number of values that are less than or equal to $f_{ords}$ across a third and fourth plurality of time deltas related to that same pair of participants and instrument, and halving that count.

The system may, on a per instrument basis, determine a quantified level of temporal fairness with unit time for an instrument on that venue, by finding a single minimum $f_{mkdata}$ value and separately a single minimum $f_{ords}$ value such that the criteria described above is met for each pair in a plurality of pairs of participants on that instrument (and not just a single pair as described above), and summing those two minimum "f" values together. This sum may subsequently be used to inform the "floor value" or "delay period" of an Ideal Latency Floor or other such mechanism deployed on the venue for that instrument. Alternatively, for simplicity, the maximum such sum across a plurality of instruments on the venue may be used to inform the value of an Ideal Latency Floor, and that maximum sum may reflect the temporal fairness of the venue as a whole.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for quantifying temporal fairness on an electronic trading venue. From the perspective of causation, an electronic trading venue may be considered to be temporally fair if properties of the components comprising the venue (and therefore under the control or ownership of that venue's operator) do not themselves cause systemic bias in determining which participants win races to "make" or "take" prices on the venue. Such systemic bias can manifest in market data distribution, particularly if one market participant is habitually being sent their market data before another. Such systemic bias can also separately manifest in the processing of order messages received by the venue, particularly if one market participant's orders are habitually "overtaking" another's, i.e., the former participant's orders being received by the venue earlier than the latter participant's, but the latter's being processed for matching by the venue before the former's.

Mathematically, an electronic trading venue may be considered to be temporally fair if the following two conditions—one relating market data distribution, the other to the venue's receipt and ultimate processing of orders—are met when applied all pairs of participants on each instrument that trades on the venue. Relating to market data: for each pair of participants on each instrument, the number of times the first participant receives (or is sent) a market data update before the second should be approximately equal to the number of times the second participant receives (or is sent) a market data update before the first. Relating to orders: for each pair of participants on each instrument, the number of times an order sent by the first participant overtakes one sent by the second, should be approximately equal to the number of times an order sent by the second participant overtakes one sent by the first. It is to be noted that both of these conditions can be only "true" or "false", and do not quantify the extent to which temporal (un)fairness exists.

The systems and methods described herein may quantify temporal fairness as a scalar value with unit of time on an electronic trading venue. When this scalar value is larger in magnitude it may indicate a higher degree of temporal unfairness; a scalar value of zero may indicate temporal fairness has been achieved. Additionally, upon finding a non-zero scalar value for temporal fairness on a venue, a venue operator may choose to deploy an Ideal Latency Floor on the venue with the "floor value" set to that non-zero scalar value (or larger), to rectify the venue's temporal unfairness.

The systems and methods described herein may specify, on a per instrument basis, that two minimum "f" values—one for orders "$f_{ords}$", and separately one for market data "$f_{mktdata}$"—be found such that the two equations set forth below are satisfied when applied to each pair of participants selected from a plurality of them on the instrument.

Pertaining to market data, for a pair of participants on an instrument, given $f_{mktdata} \geq 0$, the systems and methods described herein may identify a minimum value for $f_{mktdata}$ be found such that the number of values strictly greater than $f_{mktdata}$ in a first plurality of time deltas plus "X" is approximately equal to the number of values strictly greater than $f_{mktdata}$ in a second plurality of time deltas plus "X". Typically, though not necessarily, the value of "X" will be determined by counting the number of values across both that first and second plurality of time deltas that are less than or equal to $f_{mktdata}$, and halving that count. The construction of these pluralities of "time deltas" for market data is specified by the invention and discussed subsequently herein.

Pertaining to orders the invention specifies that for a pair of participants on an instrument, given $f_{ords} \geq 0$, the systems and methods described herein may identify a minimum value for $f_{ords}$ such that the number of values strictly greater than $f_{ords}$ in a first plurality of time deltas plus "Y" is approximately equal to the number of values strictly greater than $f_{ords}$ in a second plurality of time deltas plus "Y". Typically, though not necessarily, the value of "Y" will be determined by counting the number of values that are less than or equal to $f_{ords}$ across both a third and fourth plurality of time deltas related to that same pair of participants on that instrument, and halving that count. The construction of these pluralities of "time deltas" for orders will be described herein.

Pertaining to market data, the first and second plurality of "time deltas" for a pair of participants on an instrument may be constructed as follows. At each market data update for an instrument, separate messages may be sent to each participant in the pair reflecting a point-in-time view of the state of the market (e.g., bids and offers) on that instrument. If in that update, the first participant is sent his before the second, then amount of time that elapses between the sending of the first participants message, and sending of the second's is inserted into the first plurality of time deltas. Alternatively, if the second is sent his message before the first, then the amount of time that elapses between the sending of those two messages is inserted into the second plurality of time deltas. The process of inserting values (specifically differences in elapsed time) into the pluralities of time deltas may be repeated over a plurality of market data updates; the selection of such updates will be discussed herein. Further, since on some venues each participant may be sent multiple messages even at a single update, the systems and methods described herein may identify which message is to be considered, which will be described herein.

Pertaining to orders, the first and second plurality of "time deltas" for a pair of participants on an instrument may be constructed as follows. If the venue receives an order for an instrument from the first participant before a similar such order for that instrument from the second, but the venue ultimately processes (e.g. against the instrument's limit order book) the second's order before the first's then the elapsed time between the processing of the two orders is optionally (depending on the specific embodiment) added to the elapsed time between the receipt of the two orders, and the resulting sum is inserted into the second plurality of time deltas. When the second participant's order is received before the first's similar such order, but the first's is ultimately processed by the venue before the second's, the analogous computation occurs and the resulting value is inserted into the first plurality of time deltas. The process of inserting values into the pluralities of time deltas may be repeated over a plurality of orders, the selection of which is specified by the invention and is discussed subsequently herein. The systems and methods described herein may further specify what it means for orders to be "similar", which will be described herein.

Pertaining to orders, the third and fourth plurality of "time deltas" for a pair of participants on an instrument may be constructed as follows. If the venue receives an order for an instrument from the first participant before a similar such order for that instrument from the second, the amount of elapsed time between the receipt of those two orders (in some embodiments, additionally summing this value with, or instead using, the amount of elapsed time between their ultimate processing by the venue) is inserted into the third plurality of time deltas. When the venue receives an order for the instrument from the second participant before a similar such order from the first, the analogous computation occurs, and the resulting value is inserted into the fourth plurality of time deltas. The process of inserting values into the pluralities of time deltas may be repeated over a plurality of orders, according to the same criteria chosen for the selection of orders using for the first and second plurality of time deltas for orders, as previously described.

Relating to the construction of market data time deltas above, the systems and methods described herein may receive from a user a selection of specific criteria, such that in each market data update there is a maximum of one such message sent to each participant that is to be considered based on the criteria. Non-limiting examples of criteria for selecting such market data updates, include but are not limited to, the first credit-screened view of the limit order book sent to a participant in an update, or the first unscreened such update sent to a participant, and so on. For the avoidance of doubt, in the case where a pair of participants is not both sent a message meeting the selected criteria within a given update, there will be no value inserted into either's plurality of time deltas relating to that update (and pair).

Relating to the construction of order time deltas above, the systems and methods described herein may receive from a user a selection of specific criteria that determine whether two or more orders are "similar" to one another on an instrument. Non-limiting examples of such criteria include, but are not limited to: all orders sent on the instrument regardless of their limit price, side or quantity; or, orders of the same side (i.e., buy or sell) sent on the instrument; or, the first order sent by a participant in a specific race to "make" or "take" a price on the instrument, as the term "race" is used in U.S. patent application Ser. No. 14/533,543, filed Nov. 5, 2014, entitled, "Ideal Latency Floor," and so on.

Relating to both the construction of market data time deltas and the construction of order time deltas the specific orders or market data updates to be included in the methodology may be selected by the user of the invention according to specific criteria. Non-limiting examples of such criteria include, but are not limited to: events (orders or market data updates) occurring over a given time horizon such as an entire trading day, or an entire trading week, or a particularly busy period of time during the day over a number of days, and so on. All, or a sampling of such events (orders or market data updates), that occurred during the specified time may be considered.

The term "market participant" (or simply "participant") is intended to be broadly construed to refer to any entity that receives (through a computing device) market data from the venue, or sends (through a computing device) order-related messages to the venue, including, but not limited to: a firm that conducts business on the electronic trading venue, a credit entity associated with such a firm (a single firm may have a plurality of credit entities), or a user (human or otherwise). In the foregoing text, the user of the invention will select the specific form of participant to which methodology will apply.

Exemplary System Architecture

Figure 1:
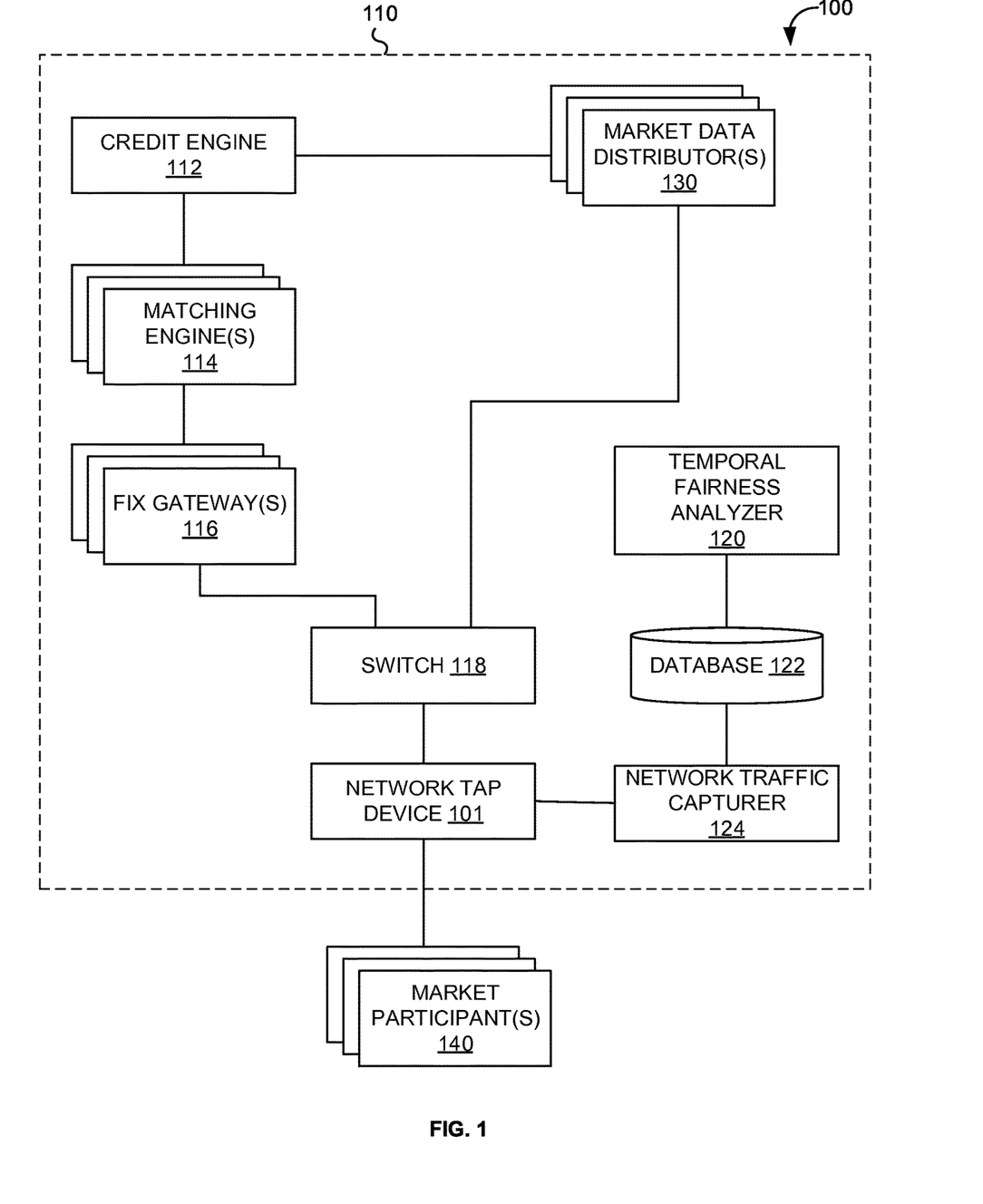
FIG. 1 illustrates an exemplary system for quantifying fairness of an electronic trading venue, according to an implementation of the invention.

FIG. 1 illustrates an exemplary system 100 for quantifying fairness of an electronic trading venue 110, according to an implementation of the invention. System 100 may include electronic trading venue 110 (used interchangeably with "venue 110" for convenience), one or more market data distributors 130, one or more market participants 140, and/or other components.

Venue 110 may include a credit engine 112, a matching engine 114, a FIX gateway 116, a switch 118, a network tap device 118, a temporal fairness analyzer 120, a database 122, a network traffic capturer 124, a market data distributor 130, and/or other components. Market data distributor 130 may each receive information about matches and the Central Limit Order Books (CLOBs) and credit, and sends, to market participants 140, a credit-screened and unscreened view of the CLOB for the instruments that trade on venue 110.

Credit engine 112 handles credit relationships and credit lines among market participants 140. Each matching engine 114 handles a subset of instruments traded on venue 110, and maintains the CLOBs or other similar structure for those instruments. A matching engine 114 causes two orders to match if they are of opposite sides (buy and sell), are price compatible, and if, according to credit engine 112, the two participants submitting the orders have credit with one another.

FIX gateway 116 may each receive and send Financial Information eXchange ("FIX") protocol messages such as new orders requests, execution reports, and so on. More than one of each of the above components of venue 110 (e.g., multiple market data distributors 130, multiple FIX gateways 116, etc.) may be used to achieve adequate performance (e.g., response times, throughput, etc.) through distributed (e.g., parallel) computing.

Market participants 140 (also referred to interchangeably as "participants 140" for convenience) are each entities that conduct business on venue 110 (represented in system 100 as devices used by such participants to interface with venue 110).

The various components illustrated in FIG. 1 may communicate with one another via one or more communication links (represented by lines between such components). The communication links may include network links through a network described herein. The various communication links are shown for illustration and not limitation, as one or more communication links between components not otherwise illustrated may be used as well.

In an exemplary operation, market participants 140 send in orders (including cancels, amendments, etc.) to venue 110 over the network, and receive market data updates from the venue over the network. In either case, the traffic maybe bi-directional (e.g., order-related traffic may be sent from venue 110 to participants 140 as execution reports for orders, and market data-related traffic maybe sent from participants 140 to venue 110 as subscription requests for specific instruments). Order-related network traffic is routed by switch 118, which may be implemented as a conventional network switch device, to one or more of the FIX gateway 116. Market data-related network traffic may be provided by market data distributor 130 and is routed by switch 118 to participants 140.

Network tap device 101 may allow network traffic to flow through it, but also may forward a verbatim copy of all the traffic that flows through it to the network traffic capturer 124, which may attach timestamps to each of the packets it receives in the network traffic from the network tap device 101. Network traffic capturer 124 may subsequently write those packets, or information contained within them, to venue database 122.

Network traffic capturer 124 may perform additional processing on the network traffic before it is written to the venue database 122. For instance, the network traffic capturer 124 may extract from the network packets the application-level messages (market data updates and FIX messages, or certain fields contained within those messages) and write them to separate files. In some instances, network traffic capturer 124 may write one file per instrument per trading session.

A mapping from IP addresses to individual participant 140 (since a single participant may use a plurality of IP addresses to connect to venue 110), and mappings from IP addresses to specific components in venue 110 (e.g., to a certain FIX gateway 116 or market data distributor 130 may also be written to venue database 122. The IP address visible in the network traffic at the point in the network where the network tap device 101 is installed may be different than the IP address of a given component to which switch 118 is attached (e.g., the FIX gateway 116, the matching engine 114, a credit engine 112, or market data distributor 130), because of Network Address Translation (sometimes referred to as "NAT'ing) that the switch 118 may perform. Further, and although not shown explicitly as a connection (line) on the diagram above, matching engine 114 may populate venue database 122 with the sequence in which they actually received messages (orders), noting that reordering of messages (orders) may occur as network packets flow through the switch 118 and FIX gateway 116 components up to the matching engine 130 (and indeed other network devices and software that may exist anywhere between switch 118 and matching engine 114 may also cause reordering).

Temporal Fairness Analyzer 120

Figure 2:
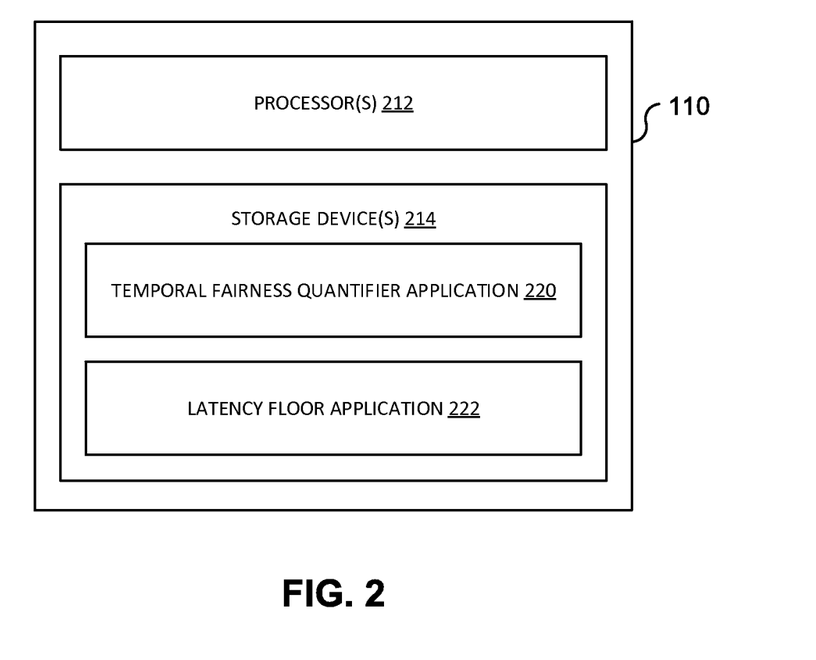
FIG. 2 depicts an exemplary temporal fairness analyzer, according to an implementation of the invention.

FIG. 2 depicts an exemplary temporal fairness analyzer 120, according to an implementation of the invention. Temporal fairness analyzer 120 may be configured as a server (e.g., having one or more server blades, processors, etc.), a computer (e.g., a desktop computer, a laptop computer, etc.), and/or other device that can be programmed to quantify temporal fairness of electronic trading venue 110. In an implementation, temporal fairness analyzer 120 may be configured as a cluster of commodity computing hardware programmed by various computer program instructions. For instance, the cluster may execute Apache™ Hadoop® software. In these implementations, database 122 may be implemented via the Hadoop Filesystem (HDFS) on this cluster and the instruction(s) that programs temporal fairness analyzer 120 may be implemented to use the MapReduce API and HDFS-client API provided by Hadoop, and in the Java™ programming language.

Regardless of its particular implementation or configuration, temporal fairness analyzer 120 may include one or more processors 212 (also interchangeably referred to herein as processors 212, processor(s) 212, or processor 212 for convenience), one or more storage devices 214 (which may store various instructions that program processors 212), and/or other components. Processors 212 may be programmed by one or more computer program instructions. The computer program instructions may include, without limitation, a temporal fairness quantifier application 220, a latency floor application 222, and/or other instructions that program temporal fairness analyzer 120 to perform various operations, which are described in greater detail herein. As used herein, for convenience, the various instructions will be described as performing an operation, when, in fact, the various instructions program the processors 212 (and therefore temporal fairness analyzer 120) to perform the operation.

Quantifying Temporal Fairness in an Implementation

In an implementation, a software program (e.g., temporal fairness quantifier application 220) may be written in a high-level programming language such as Java™ to compute the $f_{mktdata}$ and $f_{ords}$ values on a per instrument basis. The program may take as input (e.g. via command line or configuration file), the instrument(s) on which it is to be run, whether it is to be run on orders and/or market data, the time period over which it to be run, the criteria for selection of market data update messages and/or the criteria for identifying similar orders, and the specific participants of which all pairs of such will be subject to the analysis.

The program may utilize a map data structure (e.g., java.util.HashMap) to store, in main memory, the pluralities of time deltas utilized by the methodology. For market data analysis, the keys of such this map may be the 3-tuple of [instrument, participant1, participant2]. For order analysis, the key may be the 4-tuple of [instrument, participant1, participant2, flag], where "flag" taking the value of "true" indicates the corresponding value associated with the key pertains to time deltas for similar "overtaking" orders only, and where "flag" taking the value "false" indicates the corresponding value associated with the key pertains to time deltas associated with similar orders in general. The data structure used for the keys of the map may be a list of strings (e.g., instances of the class java.util.LinkedList<String>).

Regardless of whether the previously described map is used for market data and/or orders, the value corresponding to each key will be participant1's time deltas relative to participant2's. The data structure used for the map's values may be a list of integers (e.g., java.util.ArrayList<Integer>). If the timestamps are captured as real numbers, the program may store the differences (i.e., time deltas) between them using as integers by using a different precision and scale, e.g., for reasons of space and performance. For instance, a real number difference expressed in seconds may be multiplied by 1,000,000 to obtain a rounded, non-zero integer difference in microseconds).

As the program reads from the file or database containing data from the network traces, that data being either timestamped order messages and/or timestamped market data messages, sorted by timestamp, upon such a pair of messages meeting the criteria for selection specified as input to the program, the previously described map will be referenced. In particular, the participants for the first and second messages will be discerned from each message, either through the IP address associated with the message's source or destination, or through the message's payload (e.g., the SenderCompId field on a FIX order message). The instrument will also be discerned, likely from the payload of the message itself (e.g., the Symbol field on a FIX order message). In this manner, all pairs of participants that sent or received messages subject to the analysis will be encountered. The first time such a pair of participants is encountered for the instrument and analysis type, the key will be inserted into the map along with a new instance of list containing the time delta. On subsequent times that pair of participants for the analysis type and instrument is encountered, through processing a later pair of messages, the list (value) of the map will be fetched from the map by way of the key, and the time delta added to that existing list.

In some venue implementations the program may be able to determine which market data update messages belong to a given update through examination of the payload of the message (e.g., by looking at the "market by price sequence number" in a Reuters Foundation API message). Once all the messages for a given update have been read into main memory, and processed against the earlier described map, they may be discarded from main memory so as to ensure the program does not run out of memory.

In some venue implementations the program may be able to determine the order in which the order messages were processed against the venue's limit order book by examining the integer id in the OrderId field of the FIX message response. In this manner, by relating the inbound FIX order messages to their outbound FIX response messages the program may be able to determine both the ordering in which the orders were received, and the ordering in which they were ultimately processed by the venue. Further, a message's timestamp along with the Price, Side, Symbol and SenderCompId fields of the (FIX) message's payload may enable the program to determine, for instance, which orders were similar to one another, per the input parameter to the program specifying the same.

Upon completing the reading of the message data for the time period specified, and populating the map with all the time deltas associated with that period, the program may attempt to find a minimum "f" value(s) for orders and/or market data. For a given pair of participants on an instrument and for an analysis type (i.e., orders or market data) it may do so by generating a sorted set (e.g., using java.util.TreeSet) of all the unique values that appear in that pair of participants lists of time deltas, and adding to a zero value to that sorted set. The program may then iterate over that sorted set of unique time delta values and test each one using the equations for "approximate equality" described earlier in this document that reference $f_{ords}$ and $f_{mktdata}$. This process of "testing" each candidate f value from the sorted set involves evaluating the left hand side and the right hand side of the equation with each specific f value. This testing process is described further below.

Since a computer does not inherently have a notion of "approximately equal" per the previously described equations involving $f_{ords}$ and $f_{mktdata}$, in an implementation a statistical test at a predefined level of statistical confidence may be applied, to determine if the two sides of the equation are indeed approximately equal to one another. The statistical test may compare two "actual" values to two "expected" values for each "f" value tested, at a predefined level of statistical confidence. With regard to this test, the two "actual" values may be those returned by the right and left hand sides of the "approximately equal" equation, respectively. The two "expected" values passed into the statistical test may each be half the sum of the "actual" values. If the statistical test utilized (e.g., a chi-squared test) returns a value greater than the predefined level of statistical confidence (e.g. 0.01) then the f-value that generated these "actual" values is a candidate for the minimum f value, and it may be said that for this f value the test for approximate equality has "passed" (cf. failed).

As the program iterates over all distinct time deltas for a pair of participants on an instrument for an analysis type, it may generate and store the ranges of f-values which passed the statistical test for approximate equality. Upon iterating over all pairs of participants on each instrument for an analysis type, and calculating ranges of candidate f-values for each pair, the program may find an overall minimum f value for that analysis type and instrument, by examining those ranges and finding the minimum value that falls within the ranges of all such pairs, noting that any f value bigger than the largest value found in a pair's range is also implicitly passes the statistical test for that pair. Depending on the analysis type, the value found to satisfy all ranges for that instrument and analysis type may be the final output of the program for that instrument, i.e., the minimum $f_{mktdata}$ or minimum $f_{ords}$.

The program described above may be parallelized by implementing it as a Mapper-only (i.e., no reduce phase) Hadoop MapReduce Job, whereby each Mapper processes a single instrument and single analysis type. Such parallelization may be required to ensure the program does not run out of memory, and runs to completion in a satisfactory amount of time.

Using the Minimum "f" Value to Inform the Value of a Latency Floor

In an implementation, latency floor application 222 may use the minimum f value (determined by summing the minimum $f_{mktdata}$ with the minimum $f_{ords}$ for an instrument) to inform the value of a latency floor in order to attempt to make the electronic trading venue 110 more fair.

In the context of an electronic trading venue 110, a latency floor (also known as randomization mechanism) can be thought of as a limited exception to the time-priority rules for processing messages. At short timescales messages are generally not processed in the order in which they are received. At longer timescales messages received earlier are still processed before those received later. The "value" of the latency floor is what distinguishes the short timescale from the longer timescale.

An appropriately-designed latency floor may be used to remedy temporal fairness issues on an electronic trading venue, by removing the advantage a participant gains from receiving prices earlier than others and/or by having his orders subjected to longer or shorter amounts of time between receipt and processing by the venue than others. If a latency floor is implemented by a venue the value of the latency floor can be informed on a per instrument basis by analyzing all pairs of a plurality of participants on each instrument in the manner set forth above to find two minimum f values: one for market data ($f_{mktdata}$) and the other for orders ($f_{ords}$). The value of the floor can then be set on a per instrument basis by combining the two minimum f values (e.g. by summing them).

Advantageously this may result in a value of the floor that is no longer than it needs to be to remedy temporal fairness on the venue (noting that negative outcomes maybe associated with unnecessarily large latency floor values). Alternatively, for simplicity, the floor value may be set on a venue as a whole, or on an instrument group basis, with the value being set to the largest sum of minimum f values in market data and orders on the instruments in the group.

The floor may be set to an even larger value than the sum of the two minimum f values if the operator of the venue additionally wants to establish a "minimum response time" for all market participants to have a chance of winning a race to make or take a price (a further discussion of response times and equal chances of winning is described in U.S. patent application Ser. No. 14/533,543, the contents of which is hereby incorporated by reference herein in its entirety). In this "minimum response time" approach the value of the floor may be informed by the sum of the minimum f values on the market data and orders for an instrument, plus the minimum desired response time. For simplicity, it may also be performed on an instrument group basis by choosing the maximum sum of minimum f values for the instruments in that group, and adding to that sum the desired minimum response time to yield the floor value.

Figure 3:
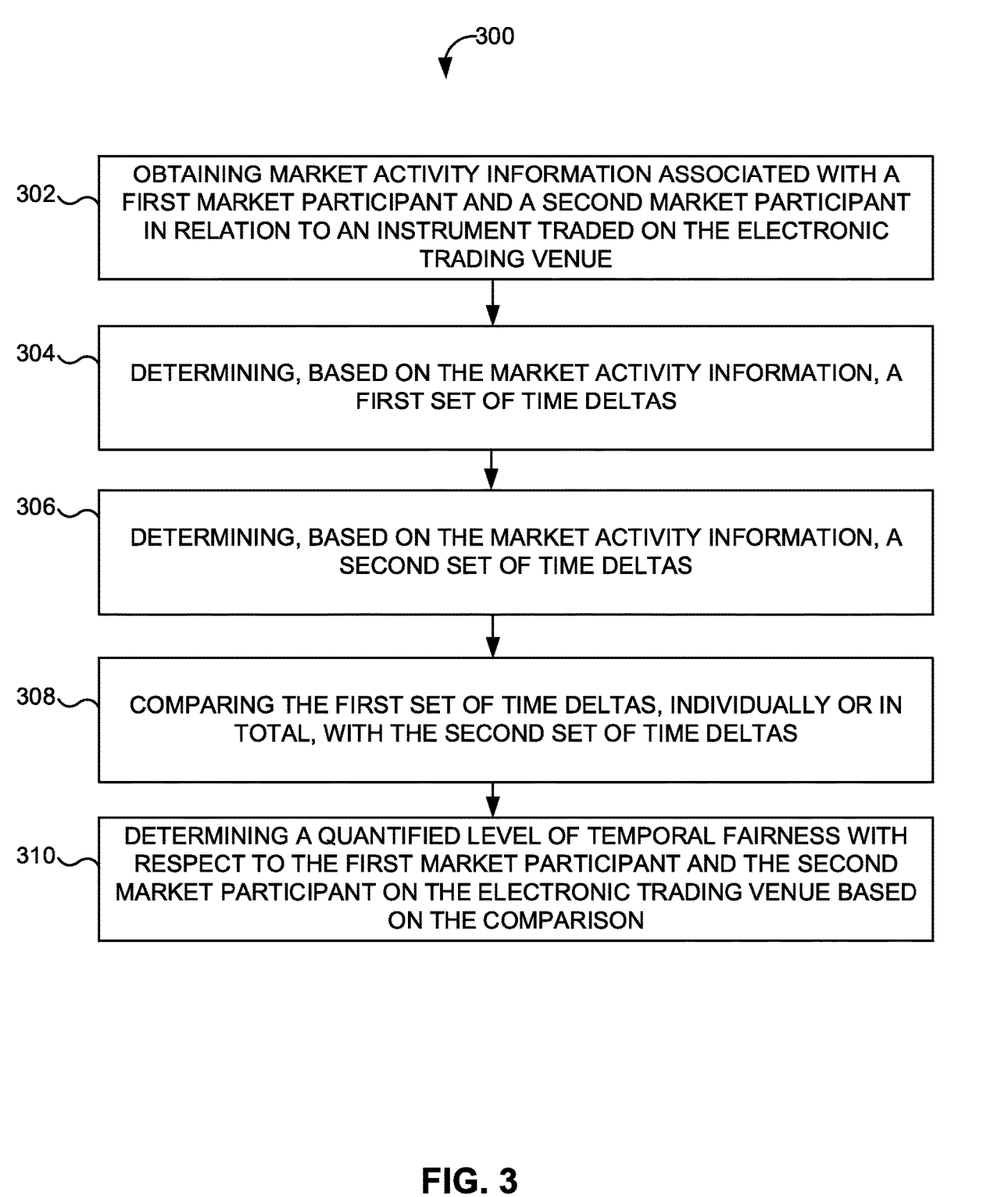
FIG. 3 depicts a process for quantifying fairness of an electronic trading venue, according to an implementation of the invention.

FIG. 3 depicts a process 300 for quantifying fairness of an electronic trading venue, according to an implementation of the invention.

In an operation 302, process 300 may include obtaining market activity information associated with a first market participant and a second market participant. Market activity information may indicate messages received from market participants relating to an instrument traded on the electronic trading venue. Such messages may relate to, without limitation, orders (e.g., new order requests, cancel requests, replace requests, etc.).

In an operation 304, process 300 may include determining, based on the market activity information, a first plurality of time deltas that each indicate an amount of time in which the first market participant has temporally beaten the second market participant with respect to market activity related to an instrument traded on the electronic trading venue.

In an operation 306, process 300 may include determining, based on the market activity information, a second plurality of time deltas that each indicate an amount of time in which the second market participant has temporally beaten the first market participant with respect to the market activity related to the instrument traded on the electronic trading venue.

In an operation 308, process 300 may include determining a quantified level of temporal fairness with respect to the first market participant and the second market participant on the electronic trading venue based on the first plurality of time deltas and the second plurality of time deltas.

Figure 4:
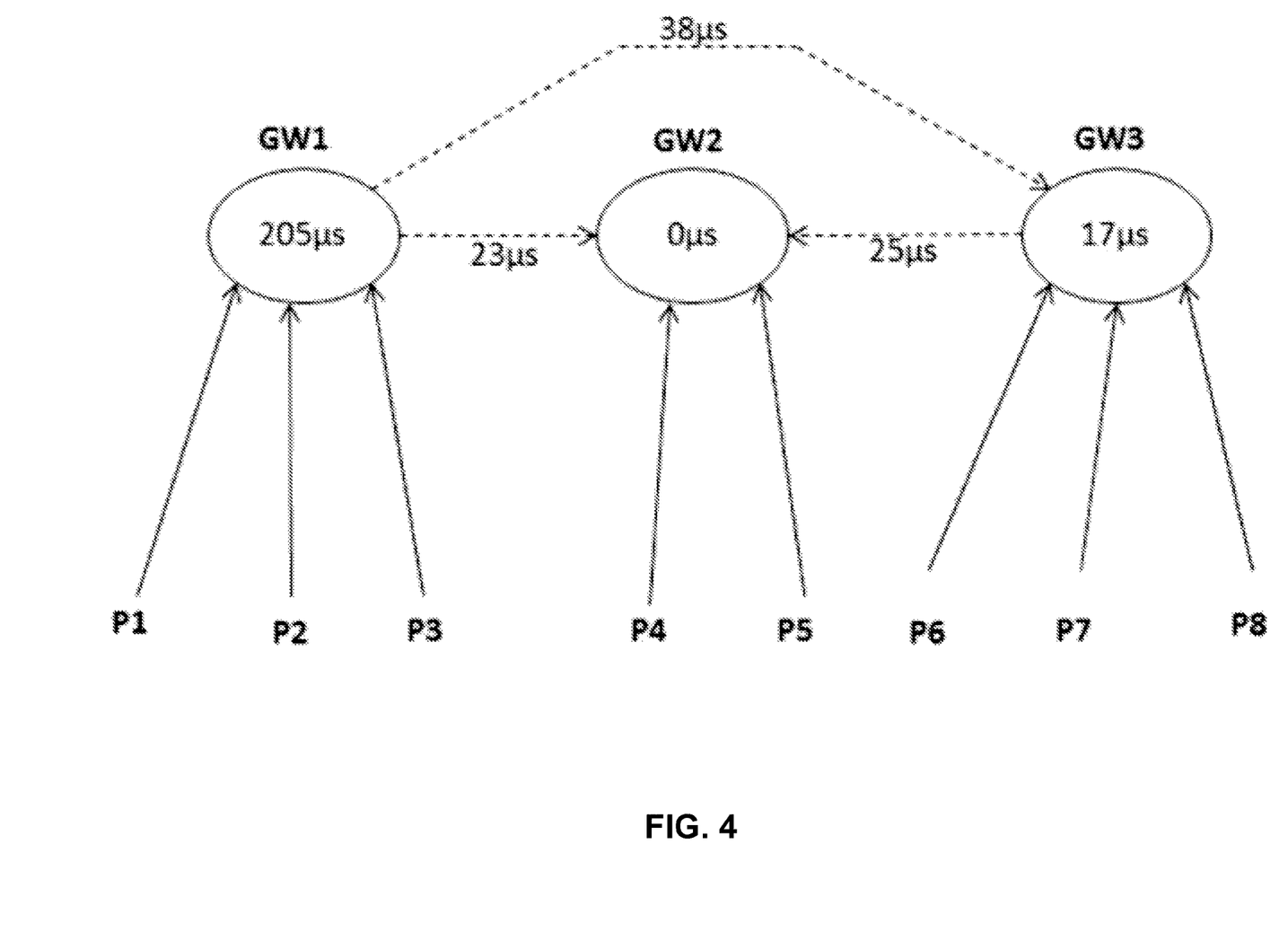
FIG. 4 is a schematic diagram that depicts quantifying temporal inter-component and intra-component temporal fairness on an electronic trading venue, according to an implementation of the invention.

FIG. 4 is a schematic diagram that depicts quantifying temporal inter-component and intra-component temporal fairness on an electronic trading venue, according to an implementation of the invention. FIG. 4 depicts how the systems and methods described herein may quantify the temporal fairness of individual components of the electronic trading venue.

As illustrated in FIG. 4, a FIX gateway component (also referred to herein as a "gateway" and each illustrated in FIG. 4 as a GW1, GW2, and GW3—although three FIX gateway components are illustrated, other numbers of FIX gateway components may be used) of an electronic trading venue may receive orders from market participants (illustrated as P1-P8, although other numbers of market participants may provide orders as well). Market Participants (P1-P8) are shown connected to these gateways by way of solid line arrows, which do not necessarily indicate unidirectional communication links.

To quantify the intra-gateway temporal fairness of GW1, system 100 may calculate the minimum $f_{ords}$ value as disclosed herein by selecting for the analysis all pairs of participants from the plurality of participants connected to that gateway. Specifically, for this gateway, these pairs would be: {P1,P2}, {P1,P3} and {P2,P3}. The intra-gateway minimum $f_{ords}$ for GW1 may be computed as 205 µs (or some other number) and this number may be visualized by placing it inside the circle representing GW1 in the figure. The same approach can be taken to quantify and visualize the temporal fairness associated with GW2 (Op) and GW3 (17 µs) as shown in the figure.

To quantify the inter-gateway temporal fairness, system 100 may calculate the minimum $f_{ords}$ value by selecting all pairs of participants connected to the pair of gateways of interest, using the participant from the first gateway as the first element in each pair of participants, and the participants from the second gateway as the second element in the pair. For instance, if the gateways chosen are GW1 and GW2 then the pairs from which the minimum $f_{ords}$ value should be computed are: {P1,P4},{P1,P5},{P2,P4},{P2,P5}, {P3,P4} and {P3,P5}. If the minimum $f_{ords}$ value is computed as 23 µs then a dotted line maybe be drawn between GW1 and GW2 showing this value, as indicated in FIG. 4. Note that if the dotted line is given a direction, by way of an arrow as shown in the diagram, it may indicate which gateway is "dominating" the other e.g., because more orders from the former overtake the latter. As depicted in the diagram, other inter-gateway fairness values can also be calculated and displayed in a similar manner.

It is to be appreciated that while FIG. 4 shows inter- and intra-component temporal fairness values for order-related venue components, that this same approach can be used for market data-related venue components. By selecting specific participants based on the market data component they are connected (either directly or transitively if there are multiple "layers" of such components), system 100 may similarly quantify temporal fairness for market data distribution components too. The approach specified in the invention where a minimum value for $f_{mktdata}$ is computed from all pairs of those selected participants—selection of which is based on the market data component each is connected to—would be used.

It is to be further appreciated that the approach and visualization-style exemplified in FIG. 4 may allow the operator of the electronic trading venue to rebalance or reconfigure which participants are connected to which specific venue components, or for instance, to re-implement those venue components using different technology, so as to minimize the overall minimum $f_{ords}$ and $f_{mktdata}$ values on that venue.

Although illustrated in FIG. 1 as a single component, computer system 110 and end user device 140 may each include a plurality of individual components (e.g., computer devices) each programmed with at least some of the functions described herein. In this manner, some components of computer system 110 and/or end user device 140 may perform some functions while other components may perform other functions, as would be appreciated. The one or more processors 212 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in the figures as being co-located within a single processing unit, in implementations in which processor(s) 212 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

Database 122 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various processing operations and/or data flows depicted in the figures are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail above) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method of quantifying temporal fairness on electronic trading venues, the method being implemented on a computer system having one or more physical processors programmed with computer program instructions that, when executed by the one or more physical processors, cause the computer system to perform the method, the method comprising:
    obtaining, by the computer system, market activity information associated with a first market participant and a second market participant;
    determining, by the computer system, based on the market activity information, a first plurality of time deltas that each indicate an amount of time in which the first market participant has temporally beaten the second market participant with respect to market activity related to an instrument traded on the electronic trading venue;
    determining, by the computer system, based on the market activity information, a second plurality of time deltas that each indicate an amount of time in which the second market participant has temporally beaten the first market participant with respect to the market activity related to the instrument traded on the electronic trading venue;
    determining, by the computer system, a quantified level of temporal fairness with respect to the first market participant and the second market participant on the electronic trading venue based on the first plurality of time deltas and the second plurality of time deltas;
    batching, by the computer system, a set of orders received within a time period determined based on the quantified level of temporal fairness;
    randomly selecting, by the computer system, an order from the batched set of orders; and
    processing, by the computer system, the randomly selected order before remaining orders in the batched set of orders;
    wherein determining the quantified level of temporal fairness comprises identifying, by the computer system, from among the first plurality of time deltas and the second plurality of time deltas, a minimum time delta upon which the quantified level of temporal fairness is based.

2. The method of claim 1, wherein identifying the minimum time delta comprises: calculating, by the computer system, a first actual value based on a number of the first plurality of time deltas that are greater than the minimum time delta, a number of the first plurality of time deltas that are less than or equal to the minimum time delta, and a number of the second plurality of time deltas that are less than or equal to the minimum time delta; calculating, by the computer system, a second actual value based on a number of the second plurality of time deltas that are greater than the minimum time delta, the number of the first plurality of time deltas that are less than or equal to the minimum time delta, and the number of the second plurality of time deltas that are less than or equal to the minimum time delta; and determining, by the computer system, whether the first actual value and the second actual value are each statistically equal to an expected value indicative of a temporally fair electronic trading venue, wherein the minimum time delta is identified based on a determination that the first actual value and the second actual value are each statistically equal to the expected value.

3. The method of claim 2, wherein identifying the minimum time delta comprises:
    testing, by the computer system, each of the first plurality of time deltas and the second plurality of time deltas to identify the minimum time delta.

4. The method of claim 1, wherein the market activity comprises a market update transmitted to the first market participant or the second market participant such that the first plurality of time deltas each relate to an amount of time in which the first market participant was sent the market update before the second market participant.

5. The method of claim 1, wherein the market activity comprises a market order received from the first market participant or the second market participant, and wherein determining a quantified level of temporal fairness with respect to the first market participant and the second market participant on the electronic trading venue comprises quantifying a level in which a first market order received from the first market participant overtakes, or is reordered with respect to, a second market order received from the second market participant.

6. The method of claim 1, the method further comprising: determining, by the computer system, a value of a latency floor based on the minimum time delta, wherein the value of the latency floor comprises the time period determined based on the quantified level of temporal fairness.

7. The method of claim 1, wherein obtaining the market activity information comprises:
    identifying, by the computer system, the first market participant and the second market participant based on a first connection from the first market participant to a component of the electronic trading venue associated with the computer system and a second connection from the second market participant to the component of the electronic trading venue.

8. The method of claim 1, wherein the market activity information is further associated with a third market participant, the method further comprising:
    determining, by the computer system, based on the market activity information, a third plurality of time deltas that each indicate an amount of time in which the third market participant has temporally beaten the first market participant with respect to the market activity related to the instrument traded on the electronic trading venue;
    determining, by the computer system, based on the market activity information, a fourth plurality of time deltas that each indicate an amount of time in which the first market participant has temporally beaten the third market participant with respect to the market activity related to the instrument traded on the electronic trading venue;
    determining, by the computer system, based on the market activity information, a fifth plurality of time deltas that each indicate an amount of time in which the third market participant has temporally beaten the second market participant with respect to the market activity related to the instrument traded on the electronic trading venue;
    determining, by the computer system, based on the market activity information, a sixth plurality of time deltas that each indicate an amount of time in which the second market participant has temporally beaten the third market participant with respect to the market activity related to the instrument traded on the electronic trading venue, wherein determining the quantified level of temporal fairness comprises determining the quantified level of temporal fairness with respect to the first market participant, the second market participant, and the third market participant on the electronic trading venue based on the first plurality of time deltas, the second plurality of time deltas, the third plurality of time deltas, the fourth plurality of time deltas, the fifth plurality of time deltas, and the sixth plurality of time deltas.

9. The method of claim 1, wherein the market activity information comprises market data update information sent to market participants, wherein the market data update information is related to the instrument,
  wherein determining the first plurality of time deltas comprises: determining, by the computer system, based on the market data update information, a first time delta that indicates a first amount of time in which the first market participant is sent a first market data update, relating to the instrument, before the second market participant, wherein the first plurality of time deltas is determined based on the first time delta; and
  wherein determining the second plurality of time deltas comprises: determining, by the computer system, based on the market data update information, a second time delta that indicates a second amount of time in which the second market participant is sent a second market data update, relating to the instrument, before the first market participant, wherein the second plurality of time deltas is determined based on the second time delta.

10. The method of claim 1, wherein the market activity information comprises order processing information used to determine whether an order from a first market participant overtakes an order from a second market participant and vice versa, wherein a given order overtakes another order when the given order is received after the other order but is processed before the other order;
  wherein determining the first plurality of time deltas comprises: determining, by the computer system, a first time delta that indicates a first amount of time relating to a first order, relating to the instrument, from the first market participant that overtakes a second order, relating to the instrument, from the second market participant, wherein the first plurality of time deltas is determined based on the first time delta;
  wherein determining the second plurality of time deltas comprises: determining, by the computer system, a second time delta that indicates a second amount of time relating to a third order from the second market participant that overtakes a fourth order from the first market participant, wherein the second plurality of time deltas is determined based on the second time delta;
  and wherein the method further comprises:
  determining, by the computer system, a third plurality of time deltas that each indicate an amount of time in which an order, relating to the instrument, is received from the first market participant before another order, relating to the instrument, is received from the second market participant, regardless of whether the other order overtakes the order; and
  determining, by the computer system, a fourth plurality of time deltas that each indicate an amount of time in which a particular order, relating to the instrument, is received from the second market participant before another particular order, relating to the instrument, is received from the first market participant, regardless of whether the other particular order overtakes the particular order, wherein the quantified level of temporal fairness is based further on the third plurality of time deltas and the fourth plurality of time deltas.

11. The method of claim 1, wherein randomly selecting the order from the batched set of orders comprises:
  generating, by the computer system, a list of market participants from which the batched set of orders were received; and
  shuffling, by the computer system, the list of market participants to create a random ordering of the market participants, wherein the order from the batched set of orders is selected based on the random ordering of the market participants.

12. A system of quantifying temporal fairness on electronic trading venues, the system comprising:
  a computer system having one or more physical processors programmed with computer program instructions that, when executed by the one or more physical processors, cause the computer system to:
    obtain market activity information associated with a first market participant and a second market participant;
    determine, based on the market activity information, a first plurality of time deltas that each indicate an amount of time in which the first market participant has temporally beaten the second market participant with respect to market activity related to an instrument traded on the electronic trading venue;
    determine, based on the market activity information, a second plurality of time deltas that each indicate an amount of time in which the second market participant has temporally beaten the first market participant with respect to the market activity related to the instrument traded on the electronic trading venue;
    determine a quantified level of temporal fairness with respect to the first market participant and the second market participant on the electronic trading venue based on the first plurality of time deltas and the second plurality of time deltas;
    batch a set of orders received within a time period determined based on the quantified level of temporal fairness;
    randomly select an order from the batched set of orders; and
    process the randomly selected order before remaining orders in the batched set of orders;
    wherein to determine the quantified level of temporal fairness, the computer system is further programmed to identify, from among the first plurality of time deltas and the second plurality of time deltas, a minimum time delta upon which the quantified level of temporal fairness is based.

13. The system of claim 12, wherein to identify the minimum time delta, the computer system is further programmed to: calculate a first actual value based on a number of the first plurality of time deltas that are greater than the minimum time delta, a number of the first plurality of time deltas that are less than or equal to the minimum time delta, and a number of the second plurality of time deltas that are less than or equal to the minimum time delta; calculate a second actual value based on a number of the second plurality of time deltas that are greater than the minimum time delta, the number of the first plurality of time deltas that are less than or equal to the minimum time delta, and the number of the second plurality of time deltas that are less than or equal to the minimum time delta; and determine whether the first actual value and the second actual value are each statistically equal to an expected value indicative of a temporally fair electronic trading venue, wherein the minimum time delta is identified based on a determination that the first actual value and the second actual value are each statistically equal to the expected value.

14. The system of claim 13, wherein to identify the minimum time delta, the computer system is further programmed to:
test each of the first plurality of time deltas and the second plurality of time deltas to identify the minimum time delta.

15. The system of claim 12, wherein the market activity comprises a market update transmitted to the first market participant or the second market participant such that the first plurality of time deltas each relate to an amount of time in which the first market participant was sent the market update before the second market participant.

16. The system of claim 12, wherein the market activity comprises a market order received from the first market participant or the second market participant, and wherein determining a quantified level of temporal fairness with respect to the first market participant and the second market participant on the electronic trading venue comprises quantifying a level in which a first market order received from the first market participant overtakes, or is reordered with respect to, a second market order received from the second market participant.

17. The system of claim 12, wherein the computer system is further programmed to: determine a value of a latency floor based on the minimum time delta, wherein the value of the latency floor comprises the lime period determined based on the quantified level of temporal fairness.

18. The system of claim 12, wherein to obtain the market activity information, the computer system is further programmed to:
identify the first market participant and the second market participant based on a first connection from the first market participant to a component of the electronic trading venue associated with the computer system and a second connection from the second market participant to the component of the electronic trading venue.

19. The system of claim 12, wherein the market activity information is further associated with a third market participant, and wherein the computer system is further programmed to:
determine, based on the market activity information, a third plurality of time deltas that each indicate an amount of time in which the third market participant has temporally beaten the first market participant with respect to the market activity related to the instrument traded on the electronic trading venue;
determine, based on the market activity information, a fourth plurality of time deltas that each indicate an amount of time in which the first market participant has temporally beaten the third market participant with respect to the market activity related to the instrument traded on the electronic trading venue;
determine, based on the market activity information, a fifth plurality of time deltas that each indicate an amount of time in which the third market participant has temporally beaten the second market participant with respect to the market activity related to the instrument traded on the electronic trading venue;
determine, based on the market activity information, a sixth plurality of time deltas that each indicate an amount of time in which the second market participant has temporally beaten the third market participant with respect to the market activity related to the instrument traded on the electronic trading venue,
wherein determining the quantified level of temporal fairness comprises determining the quantified level of temporal fairness with respect to the first market participant, the second market participant, and the third market participant on the electronic trading venue based on the first plurality of time deltas, the second plurality of time deltas, the third plurality of time deltas, the fourth plurality of time deltas, the fifth plurality of time deltas, and the sixth plurality of time deltas.

20. The system of claim 12, wherein the market activity information comprises market data update information sent to market participants, wherein the market data update information is related to the instrument,
wherein to determine the first plurality of time deltas, the computer system is further programmed to: determine, based on the market data update information, a first time delta that indicates a first amount of time in which the first market participant is sent a first market data update, relating to the instrument, before the second market participant, wherein the first plurality of time deltas is determined based on the first time delta; and
wherein to determine the second plurality of time deltas, the computer system is further programmed to: determine, based on the market data update information, a second time delta that indicates a second amount of time in which the second market participant is sent a second market data update, relating to the instrument, before the first market participant, wherein the second plurality of time deltas is determined based on the second time delta.

21. The system of claim 12, wherein the market activity information comprises order processing information used to determine whether an order from a first market participant overtakes an order from a second market participant and vice versa, wherein a given order overtakes another order when the given order is received after the other order but is processed before the other order;
wherein to determine the first plurality of time deltas, the computer system is further programmed to: determine a first time delta that indicates a first amount of time relating to a first order, relating to the instrument, from the first market participant that overtakes a second order, relating to the instrument, from the second market participant, wherein the first plurality of time deltas is determined based on the first time delta;
wherein to determine the second plurality of time deltas, the computer system is further programmed to: determine a second time delta that indicates a second amount of time relating to a third order from the second market participant that overtakes a fourth order from the first market participant, wherein the second plurality of time deltas is determined based on the second time delta;
and wherein the computer system is further programmed to:
determine a third plurality of time deltas that each indicate an amount of time in which an order, relating to the instrument, is received from the first market participant before another order, relating to the instrument, is received from the second market participant, regardless of whether the other order overtakes the order; and
determine a fourth plurality of time deltas that each indicate an amount of time in which a particular order, relating to the instrument, is received from the second market participant before another particular order, relating to the instrument, is received from the first market participant, regardless of whether the other particular order overtakes the particular order, wherein the quantified level of temporal fairness is based further on the third plurality of time deltas and the fourth plurality of time deltas.

22. The system of claim 12, wherein to randomly select the order from the batched set of orders, the computer system is further programmed to:
   generate a list of market participants from which the batched set of orders were received; and
   shuffle the list of market participants to create a random ordering of the market participants, wherein the order from the batched set of orders is selected based on the random ordering of the market participants.

* * * * *

UNITED STATES PATENT AND TRADEMARK OFFICE
CERTIFICATE OF CORRECTION

PATENT NO. : 10,909,621 B2  
APPLICATION NO. : 14/930499  
DATED : February 2, 2021  
INVENTOR(S) : Hayden Paul Melton It is certified that error appears in the above-identified patent and that said Letters Patent is hereby corrected as shown below:

On the Title Page

Please rewrite Item (63) of the "Related U.S. Application Data" section, as follows:
--(63) Continuation-in-part of application No. 14/533,543, filed on Nov. 5, 2014.--

In the Claims

Column 19, Line 31, (Claim 17), please rewrite as follows:
--the latency floor comprises the time period determined based--

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*